UNITED STATES PATENT OFFICE.

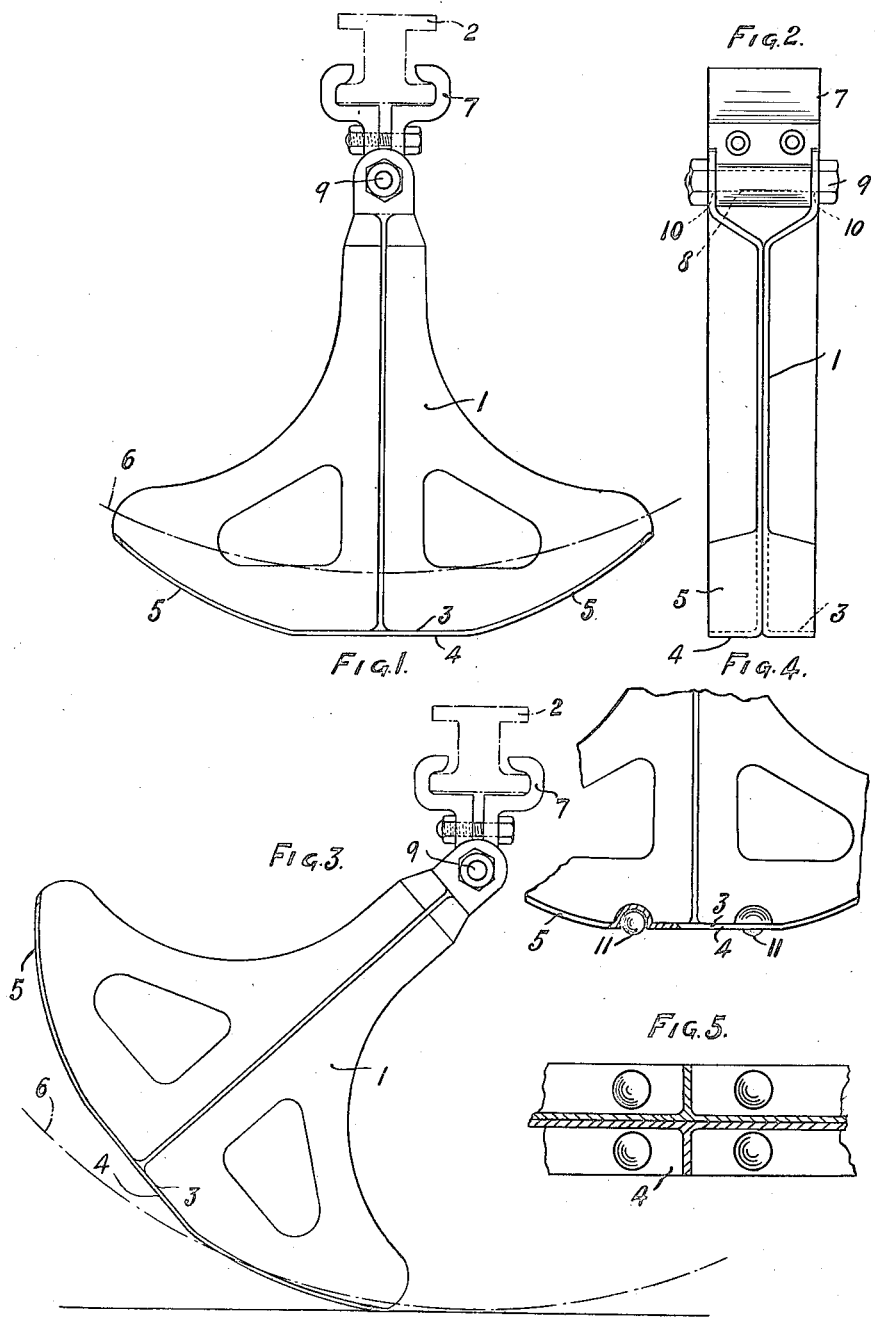

ALEXANDER MERCHANT, JR., OF FORRES, SCOTLAND.

JACK FOR VEHICLES.

1,426,664.                  Specification of Letters Patent.    Patented Aug. 22, 1922.

Application filed July 15, 1921. Serial No. 484,845.

*To all whom it may concern:*

Be it known that I, ALEXANDER MERCHANT, Jr., a subject of the King of the United Kingdom of Great Britain and Ireland, and residing at Forres, Elginshire, Scotland, have invented a certain new and useful Improvement in Jacks for Vehicles, of which the following is a specification.

This invention relates to a jack for vehicles, for example, motor road vehicles, a strut adapted for pivotal attachment to an axle and formed at the outer end with a shoe adapted when the axle is raised to rest on the ground, the shoe presenting a flat base merging into curved tracks, the strut being so dimensioned that the distance between the outer surface and the point of pivotal attachment to the axle exceeds the radius of the wheel to be raised so that when either curved track is brought into contact with the ground the vehicle may be propelled forwardly or backwardly until the flat base engages the ground and the relative wheel is raised therefrom.

According to a preferred embodiment of the invention the strut is associated with a clip adapted to be permanently secured to the axle and provided with an eye adapted to be entered by a pin threaded through corresponding eyes in the inner end of the strut.

The flat base of the strut may be fitted with castors or balls which permit the jack to move freely across the ground in any direction.

The invention is illustrated in the accompanying drawing in which Fig. 1 is a side elevation, Fig. 2 an elevation at right angles to Fig. 1, Fig. 3 an elevation showing the shoe about to engage the ground and Figs. 4 and 5 are respectively a fragmentary section and a fragmentary plan of a modification.

The improved jack shown comprises a strut 1 adapted for pivotal attachment to an axle 2 and formed at the outer end with a shoe 3 adapted, when the axle is raised, to rest on the ground. The shoe 3 presents a flat base 4 merging into curved tracks 5. The strut is so dimensioned that the distance between the outer surface of the shoe and the point of pivotal attachment to the axle 2 exceeds the radius of the wheel 6 to be raised so that, when either curved track is brought into engagement with the ground, the vehicle may be propelled forwardly or backwardly until the flat base 4 engages the ground and the relative wheel is raised.

The strut is associated with a clip 7 adapted to be permanently secured to the axle 2 and provided with an eye 8 adapted to be entered by a pin 9 threaded through corresponding eyes 10 in the inner end of the strut.

According to the modification shown in Figs. 4 and 5, the flat base of the strut is fitted with castors 11 or balls which permit the jack to move freely across the ground in any direction.

The clip may be formed as an integral part of the axle 2.

I claim:—

A jack for vehicles comprising a clip engageable with an axle of the vehicle, a strut pivotally connected at one end to said clip and formed at the other end with a shoe presenting a flat face merging into curved tracks, and rolling members fitted to said base.

In testimony whereof I have signed my name to this specification in the presence of two subscribing witnesses.

ALEXANDER MERCHANT, JR.

Witnesses:
 ISABEL ROLLO,
 FLORENCE HOUSTON.